United States Patent
Bulgrin et al.

(10) Patent No.: US 10,267,168 B2
(45) Date of Patent: *Apr. 23, 2019

(54) VANE RING FOR A TURBINE ENGINE HAVING RETENTION DEVICES

(71) Applicant: Rolls-Royce Corporation, Indianapolis, IN (US)

(72) Inventors: Charles A. Bulgrin, Plainfield, IN (US); William Westphal, Avon, IN (US); Michael Tamaddoni, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 686 days.

This patent is subject to a terminal disclaimer.

(21) Appl. No.: 14/571,976

(22) Filed: Dec. 16, 2014

(65) Prior Publication Data

US 2015/0285091 A1 Oct. 8, 2015

Related U.S. Application Data

(60) Provisional application No. 61/920,233, filed on Dec. 23, 2013.

(51) Int. Cl.
*F01D 9/02* (2006.01)
*F01D 25/28* (2006.01)
*F01D 9/04* (2006.01)
*F01D 25/24* (2006.01)

(52) U.S. Cl.
CPC ............... *F01D 9/02* (2013.01); *F01D 9/04* (2013.01); *F01D 25/246* (2013.01); *F01D 25/28* (2013.01); *Y02T 50/672* (2013.01); *Y10T 29/49321* (2015.01)

(58) Field of Classification Search
CPC . F01D 9/02; F01D 9/04; F01D 25/246; F01D 25/28; F16B 21/18; F16B 2/243; F16B 2/245; Y10T 29/49321; Y10T 24/44026; Y10T 24/44641; Y10T 24/4465; Y02T 50/672; Y10S 24/91
USPC .............................. 411/87, 90, 102, 520, 530
See application file for complete search history.

(56) References Cited

U.S. PATENT DOCUMENTS

| | | | | |
|---|---|---|---|---|
| 687,311 A * | 11/1901 | Hughes | ................... | F16B 39/20 411/87 |
| 845,362 A * | 2/1907 | King | ....................... | F16B 39/10 411/120 |
| 3,104,091 A * | 9/1963 | Vivian | .................... | F01D 9/042 415/190 |
| 4,006,659 A * | 2/1977 | Wurzel | ................... | F16B 21/18 384/903 |
| 4,821,522 A | 4/1989 | Matthews et al. | | |
| 4,883,405 A * | 11/1989 | Walker | .................... | F01D 9/023 415/137 |
| 5,249,920 A | 10/1993 | Shepherd et al. | | |
| 5,337,583 A * | 8/1994 | Giles | ....................... | F01D 9/023 24/573.09 |
| 5,411,369 A * | 5/1995 | Bouchard | ............ | F01D 25/246 415/189 |

(Continued)

*Primary Examiner* — Igor Kershteyn
*Assistant Examiner* — Eric Zamora Alvarez
(74) *Attorney, Agent, or Firm* — Barnes & Thornburg LLP (57) ABSTRACT

An engine including a turbine section with a number of vane assemblies attached to a support housing. The assemblies are secured to the support housing with fasteners and retaining clips for the fasteners.

18 Claims, 8 Drawing Sheets

(56) References Cited

U.S. PATENT DOCUMENTS

| | | | |
|---|---|---|---|
| 6,164,656 A | 12/2000 | Frost | |
| 6,364,606 B1 * | 4/2002 | Rice | F01D 25/246 415/189 |
| 6,464,457 B1 | 10/2002 | Morgan et al. | |
| 7,037,071 B2 * | 5/2006 | Antunes | F01D 9/023 415/189 |
| 7,052,234 B2 | 5/2006 | Wells et al. | |
| 7,360,988 B2 | 4/2008 | Lee | |
| 7,419,352 B2 | 9/2008 | Guentert et al. | |
| 7,674,080 B2 * | 3/2010 | Agg | F16B 39/101 411/121 |
| 7,976,274 B2 | 7/2011 | Lee et al. | |
| 8,051,564 B2 | 11/2011 | Sherlock et al. | |
| 2011/0250061 A1 * | 10/2011 | Blanchard | F01D 9/042 415/208.2 |
| 2013/0033036 A1 * | 2/2013 | Porte | B64D 33/02 285/405 |

* cited by examiner

VANE RING FOR A TURBINE ENGINE HAVING RETENTION DEVICES

This application claims priority under 35 U.S.C. § 119 to U.S. provisional application Ser. No. 61/920,233, which was filed on Dec. 23, 2013 and is expressly incorporated herein by reference.

FIELD OF THE DISCLOSURE

The present disclosure relates generally to gas turbine engines, and more specifically to retention devices for components of gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional fasteners such as rivets or bolts may not allow for the differing levels of expansion and contraction during operation of the gas turbine engine.

SUMMARY

The present disclosure may comprise one or more of the following features and combinations thereof.

A retaining clip for an engine component is disclosed. The retaining clip includes an arcuate plate extending from a first end to a second end. The arcuate plate includes a first mounting tab positioned adjacent to the first end, a second mounting tab positioned adjacent to the second end, and a mounting slot positioned between the first mounting tab and the second mounting tab. The arcuate plate is configured to deflect elastically between an unloaded curvature in which the arcuate plate defines a first radius and a loaded curvature in which the arcuate plate defines a second radius that is greater than the first radius.

In some embodiments, the arcuate plate may be a metallic plate. In some embodiments, the arcuate plate may further include an inner surface that faces radially inward and an outer surface that faces radially outward. The first mounting tab may include a first flange extending radially inward from the inner surface, and the second mounting tab may include a second flange extending radially inward from the inner surface.

Additionally, in some embodiments, the mounting slot may be positioned along the outer surface. In some embodiments, the arcuate plate may include a lobe extending radially outward from the outer surface, and the mounting slot may be defined in the lobe. In some embodiments, the mounting slot may be defined between a first curved surface and a second curved surface. The first curved surface and the second curved surface may be connected to, and extend outwardly from, the outer surface. In some embodiments, the arcuate plate may include at least two lobes, and each lobe may have a mounting slot defined therein.

In some embodiments, the arcuate plate may be biased in the unloaded curvature. In some embodiments, the arcuate plate may further include a first slot defined in the first end and a second slot defined in the second end.

According to another aspect, a turbine is disclosed. The turbine includes a circular housing including a mounting bracket positioned on an outer circumference of the circular housing, a vane nozzle segment positioned on the outer circumference of the circular housing, and a mounting pin including a head and a body extending from the head. The body extends through a bore defined in the mounting bracket and the vane nozzle segment to secure the vane nozzle segment to the circular housing. A retaining clip is positioned in a slot defined in the mounting bracket. The retaining clip exerts a radial spring load on the mounting pin to retain the mounting pin in the bore defined in the mounting bracket and the vane nozzle segment. The head of the mounting pin is positioned in a mounting slot defined in the retaining clip.

In some embodiments, the retaining clip may extend from a first end to a second end and may define an arc length between the first end and the second end that is less than the outer circumference of the circular housing. In some embodiments, the mounting bracket may be a first mounting bracket positioned between a second mounting bracket and a third mounting bracket, and the retaining clip may include a first tab that is engaged with the second mounting bracket and a second tab that is engaged with the third mounting bracket.

In some embodiments, the retaining clip may include a radially-inward side that faces the circular housing and a radially-outward side positioned opposite the radially-inward side, the mounting slot may be defined in the radially-outward side, and the first tab and the second tab may be positioned on the radially-inward side of the retaining clip. In some embodiments, the retaining clip may include a second mounting slot defined in the radially-outward side.

In some embodiments, the turbine may also include a fourth mounting bracket positioned on the outer circumference of the circular housing between the first mounting bracket and the second mounting bracket, and a second mounting pin including a head and a body extending from the head. The body of the second mounting pin may extend through a bore defined in the fourth mounting bracket and the vane nozzle segment to secure the vane nozzle segment to the circular housing. The head of the second mounting pin may be positioned in the second mounting slot of the retaining clip.

In some embodiments, the retaining clip may include a radially-outward surface, and the mounting slot may be defined between a first curved surface and a second curved surface. The first curved surface and the second curved surface may be connected to, and extend outwardly from, the radially-outward surface. In some embodiments, the retaining clip may be a metallic plate. The body of the mounting pin may be unthreaded.

According to another aspect, a method of attaching a vane nozzle segment to a turbine housing is disclosed. The method includes sliding a mounting pin into the vane nozzle segment and the turbine housing, and advancing a retaining clip into a slot defined in the turbine housing such that the retaining clip exerts a radial spring load on the mounting pin to retain the mounting pin in the vane nozzle segment and the turbine housing. The retaining clip extends from a first end to a second end and defining an arc length between the first end and the second end that is less than an outer circumference of the turbine housing.

In some embodiments, the method may also include sliding a second mounting pin into the vane nozzle segment and the turbine housing, and advancing the retaining clip into a second slot defined in the turbine housing to position a head of the second mounting pin in a mounting slot defined in the retaining clip. Additionally, in some embodiments, the method may include engaging a first mounting bracket of the turbine housing with a first tab of the retaining clip and engaging a second mounting bracket of the turbine housing with a second tab of the retaining clip to prevent further circumferential movement of the retaining clip.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
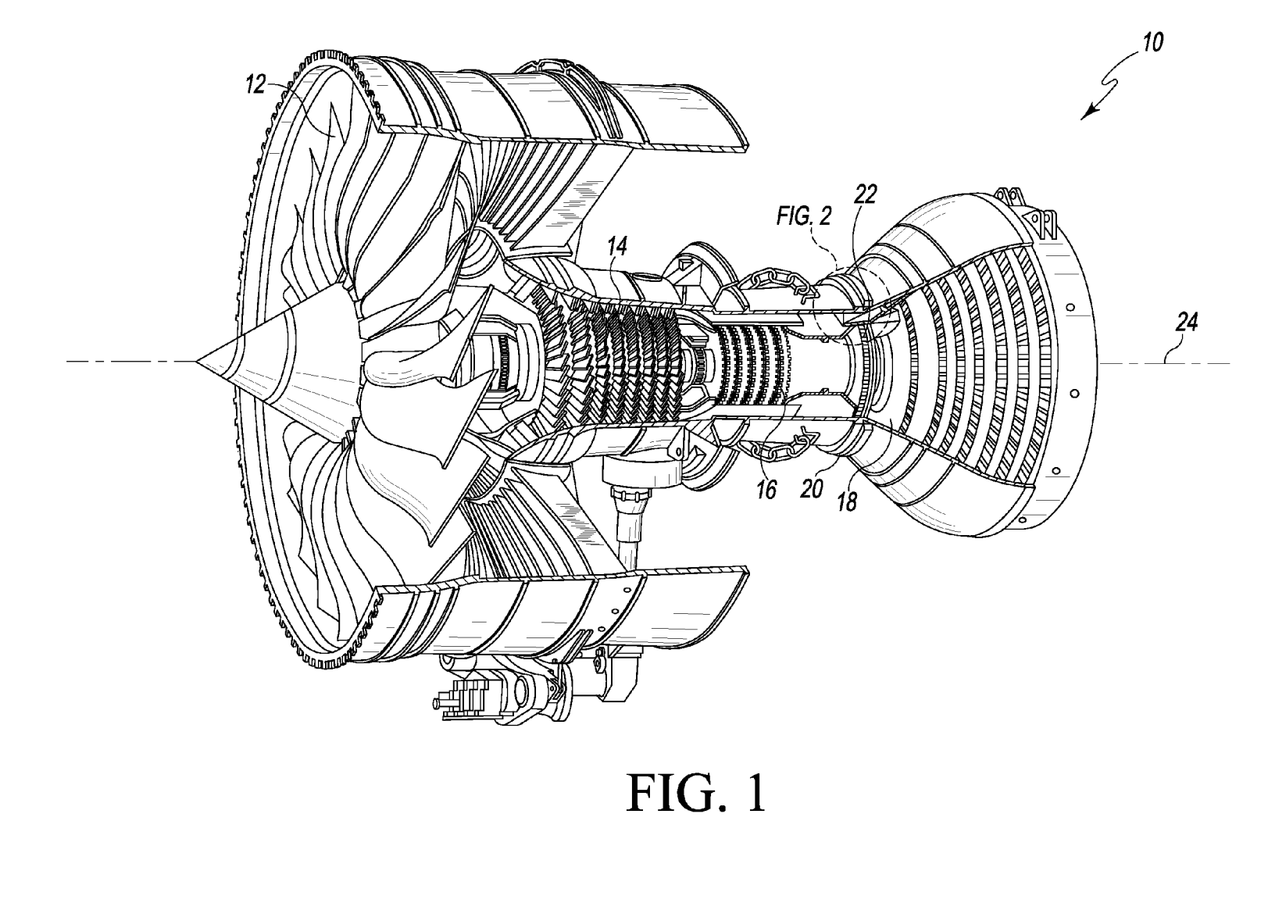
FIG. 1 is a cut-away perspective view of a gas turbine engine including a turbine section.

FIG. 1 shows an illustrative aerospace gas turbine engine 10. The engine 10 includes a fan 12, a compressor 14, a combustor 16, and a turbine 18 that are mounted in a case 20. The fan 12 is driven by the turbine 18 and provides thrust for propelling an air vehicle (not shown). The compressor 14 is configured to compress and to deliver air to the combustor 16. The combustor 16 is configured to mix fuel with the compressed air received from the compressor 14 and to ignite the fuel. The hot high pressure products of the combustion reaction in the combustor 16 are directed into the turbine 18 and the turbine 18 extracts work to drive the compressor 14 and the fan 12.

Figure 2:
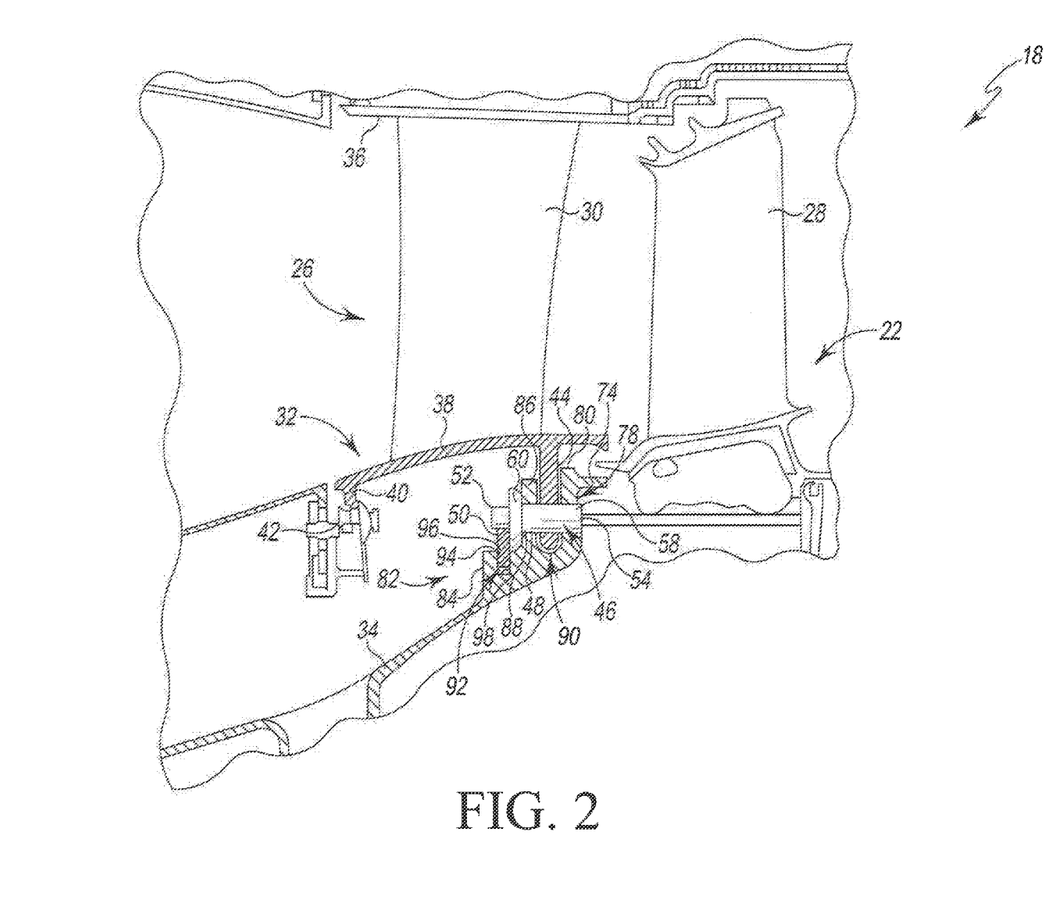
FIG. 2 is a partial cross-sectional view of the turbine section of the engine of FIG. 1.

Referring now to FIG. 2, the turbine 18 includes a turbine wheel assembly 22 that is configured to rotate about a central axis 24 (see FIG. 1) of the turbine 18 and a number of static vane assemblies 26. The turbine wheel assembly 22 includes a hub (not shown) and a plurality of blades 28 that extend radially outward from the hub. Each vane assembly 26 includes a plurality of vane 30 that extend across the flow path of the hot, high-pressure combustion products from the combustor 16. Each vane 30 is stationary and is configured to direct combustion products toward one or more of the blades 28 during operation. The combustion products push the blades 28, thereby causing the turbine wheel assembly 22 to rotate and drive the rotating components of the compressor 14 and the fan 12.

Each vane assembly 26 includes an inner base 32 secured to a support housing 34 and an outer base 36 secured to the case 20. Each vane 30 connects the inner base 32 to the outer base 36. As shown in FIG. 2, the inner base 32 includes a plate 38 attached to the vane 30 and a forward flange 40 extending radially inward from the plate 38. A fastener 42 secures the forward flange 40 of the vane assembly 26 to the support housing 34.

The inner base 32 also includes a rear flange 44, which extends radially inward from the plate 38 opposite the forward flange 40. A fastener 46 extends through a bore 48 defined in the rear flange 44 and the support housing 34. The fastener 46, like the fastener 42, secures the vane assembly 26 to the support housing 34. As described in greater detail below, an arch retainer or retaining clip 50 engages the fastener 46 and exerts an outward radial bias against the fastener 46, thereby retaining the fastener 46 in the bore 48.

As shown in FIG. 2, each fastener 46 is illustratively embodied as a bolt that includes a head 52 and a body 54 extending away from the head 52. In the illustrative embodiment, the body 54 includes a cylindrical outer surface 58 that is substantially smooth. Each bolt 46 also includes a flange 60 extending outwardly from the outer surface 58. In the illustrative embodiment, the flange 60 is also cylindrical-shaped. While the body 54 is sized to slide into the bore 48, the flange 60 is larger than the bore 48 and is configured to engage the rear flange 44 to prevent further insertion of the bolt 46 into the bore 48.

In the illustrative embodiment, the bolt is formed from a metallic material such as, for example, a nickel-based alloy. It should be appreciated that in other embodiments the fastener 46 may be formed from a non-metallic material or composite material. Additionally, the fastener 46 is illustratively shown with a substantially smooth outer surface 58; in other embodiments, the fastener may have a number of external threads defined in its outer surface.

Figure 3:
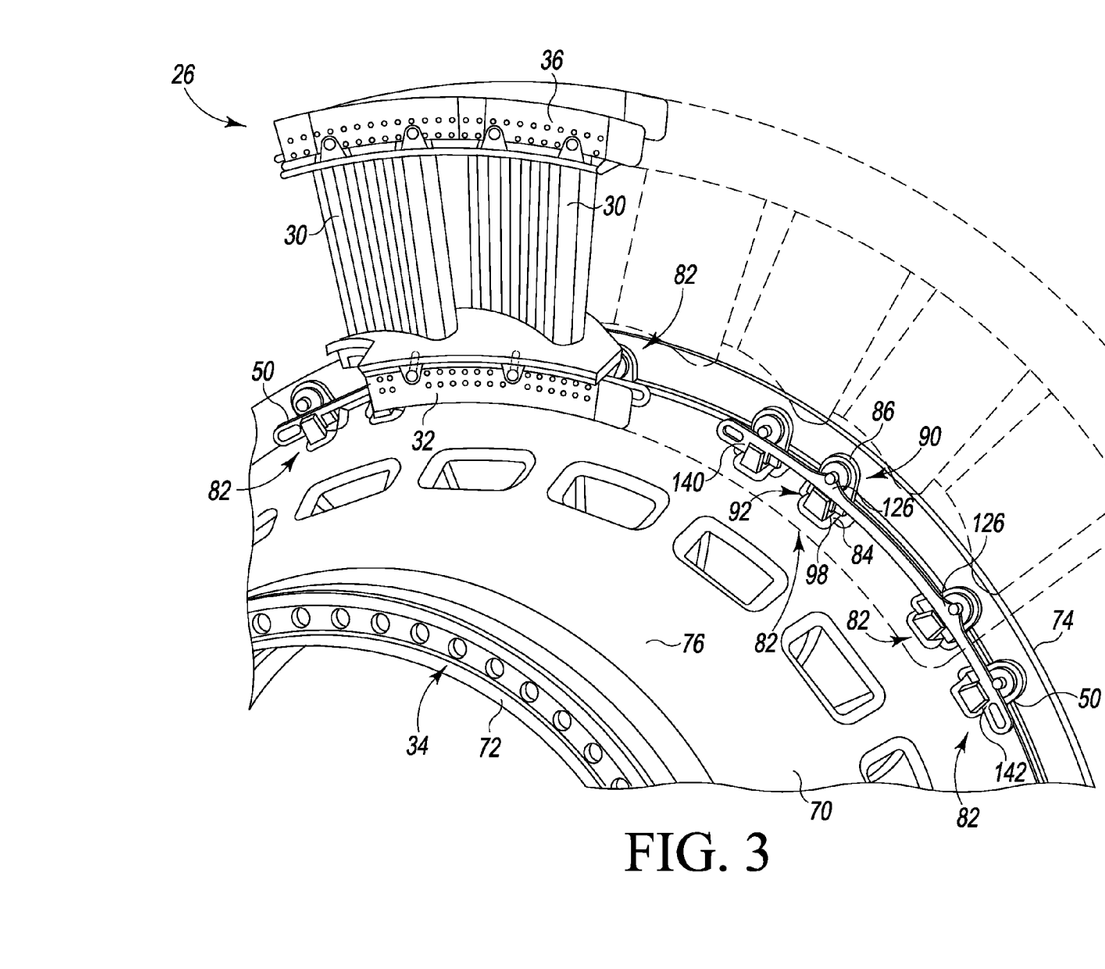
FIG. 3 is a perspective view of a number of vane nozzle assemblies, a vane support housing, and a number of retaining clips of the turbine section of FIG. 2.

Referring now to FIG. 3, the support housing 34 of the turbine 18 includes an annular body 70 that has a forward end 72 and a rear end 74. In the illustrative embodiment, the annular body 70 is formed as a single monolithic structure from a metallic material such as, for example, a nickel-based alloy. It should be appreciated that in other embodiments the annular body 70 may be formed from more than one component and may be made from a non-metallic material and/or composite material. A frustoconical surface 76 extends from the forward end 72 to the rear end 74, and an annular flange 78 extends outwardly from the rear end 74 of the body 70. The annular flange 78 has a plurality of through-holes 80 defined therein, and each through-hole 80 is sized to receive the body 54 of the fastener 46.

The body 70 also has a plurality of mounting brackets 82 arranged circumferentially along the frustoconical surface 76. Each mounting bracket 82 includes a base 84 positioned on the frustoconical surface 76 and a rib 86 that extends outwardly from the base 84. Each rib 86 has a through-hole 88 defined therein that is aligned with a corresponding through-hole 80 defined in the annular flange 78. Each through-hole 88, like each hole 80, is sized to receive the body 54 of the fastener 46. In that way, each pair of holes 80, 88 cooperates to define a portion of a bore 48.

The annular body 70 of the support housing 34 has a number of channels 90, 92 defined therein, which are sized to receive the rear flanges 44 of the vane assemblies 26 and the retaining clips 50, respectively. Each channel 90 is defined between a rear surface of each rib 86 and the front surface of the annular flange 78. As shown in FIGS. 2-3, the channel 90 extends circumferentially along the support housing 34 to receive the rear flange 44 of the vane assembly 26. The other channels 92 are defined in the base 84 of each bracket 82. As shown in FIG. 3, the base 84 includes an outer opening 94 and a pair of inner walls 96 extend inwardly from the opening 94 to an inner surface 98. The surface 98 cooperates with the inner walls 96 to define the channel 92 in each base 84. The channels 92 extend parallel to the channels 90 to receive the retaining clip 50.

Figure 4:
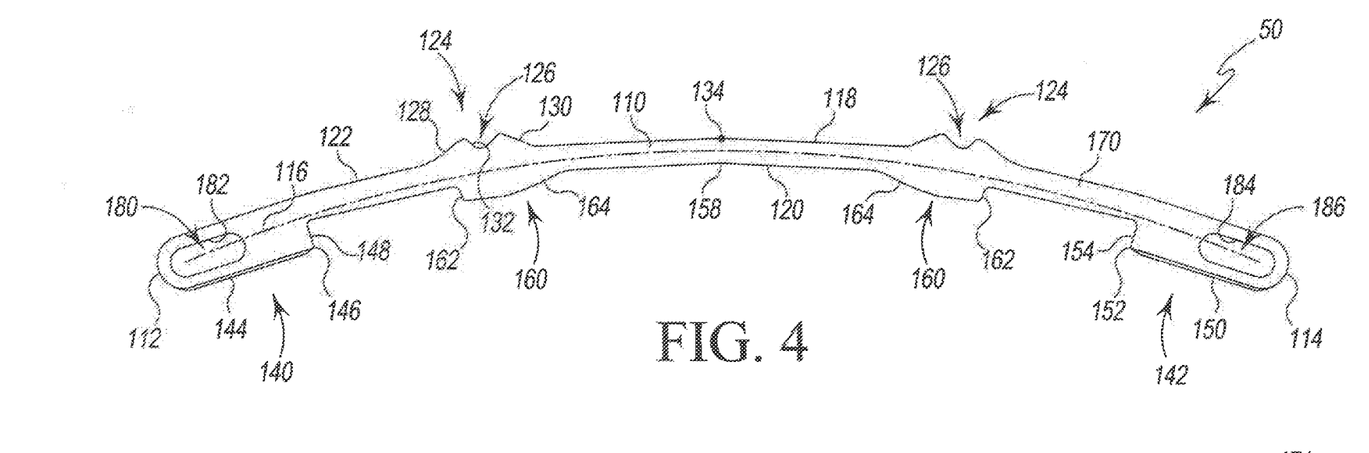
FIG. 4 is an elevation view of the retaining clip of FIG. 3.

Referring now to FIG. 4, the retaining clip 50 has an arcuate plate 110 that extends from a longitudinal end 112 to another longitudinal end 114. The plate 110 defines an arc length 116 between the ends 112, 114 that is less than the circumference of the support housing 34. In the illustrative embodiment, each retaining clip 50 bridges two adjacent vane assemblies 26. As such, multiple retaining clips 50 are used to secure all of the vane assemblies 26 to the support housing 34. The arcuate plate 110 is formed from a metallic material, such as, for example, a nickel-based alloy or a cobalt alloy. In one embodiment, the nickel-based alloy may be IN-X750 (AMS 5542) material. In other embodiments, the metallic material may be Inco 718, Waspalloy, Haynes 188, or Haynes 230.

Figure 5:
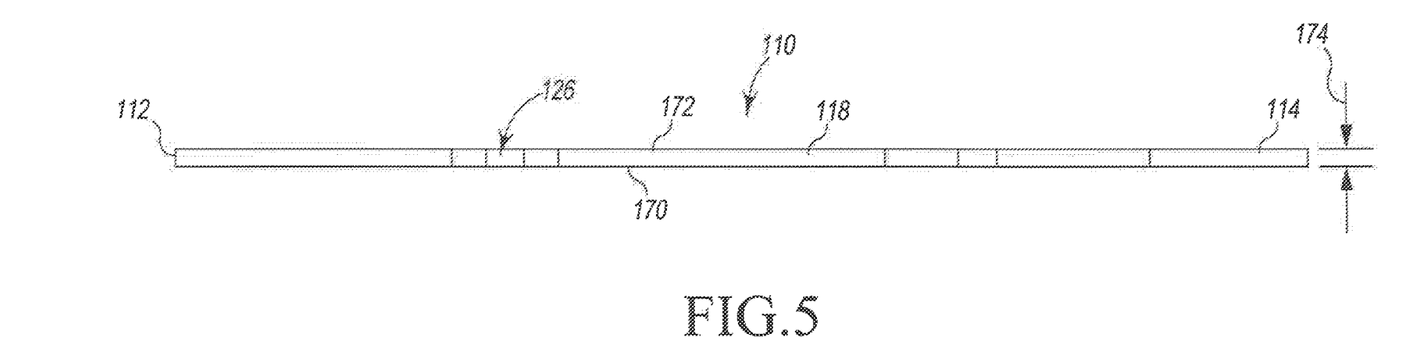
FIG. 5 is a top plan view of the retaining clip of FIGS. 3-4.

The arcuate plate 110 has an upper, outer side 118 that is positioned opposite a lower, inner side 120. When the arcuate plate 110 is assembled with the support housing 34, the outer side 118 faces radially outward, away from the center axis of the support housing 34, while the inner side 120 faces radially inward, toward the center axis. As shown in FIGS. 4-5, the arcuate plate 110 has a curved surface 122 that extends along the outer side 118. In the illustrative embodiment, the arcuate plate 110 includes a pair of outer lobes 124, which extend outward from the curved surface 122 between the longitudinal ends 112, 114.

A mounting slot 126 is defined in each lobe 124, and each mounting slot 126 is sized to receive the head 52 of a fastener 46. Each mounting slot 126 is positioned between a rounded surface 128 that extends outwardly from the outer surface 122 and another rounded surface 130 that extends outwardly from the outer surface 122. In the illustrative embodiment, a concave surface 132 extending between the surfaces 128, 130 defines the mounting slot 126. It should be appreciated that in other embodiments the mounting slots 126 may be rectangular or other geometric shape.

As shown in FIG. 4, the lobes 124 (and hence the mounting slots 126) are positioned on opposite sides of the inflection point 134 of the arcuate plate 110. The configuration of the lobes 124 in the illustrative embodiment produce increased spring force when attempting to move the clip 50 from its installed position in a circumferential direction, thereby providing secondary retention of the clip 50. In other embodiments, an outer lobe may be positioned at the inflection point. In still other embodiments, the arcuate plate 110 may include fewer than two outer lobes or more than two outer lobes. It should also be appreciated that in other embodiments the outer lobes may be omitted and one or more mounting slots may be defined in the outer surface 122 of the arcuate plate 110.

As described above, the arcuate plate 110 has an inner side 120 that is positioned opposite the outer side 118. The arcuate plate 110 has a tab 140 positioned adjacent to the longitudinal end 112 and another tab 142 positioned adjacent to the opposite longitudinal end 114. As shown in FIG. 4, the tab 140 is defined by an inner surface 144, which extends away from the end 112 to an edge 146, and a flange surface 148 that extends inwardly from the edge 146. The other tab 142 is similarly defined by an inner surface 150, which extends away from the end 114 to an edge 152, and a flange surface 154 that extends inwardly from the edge 152. The arcuate plate 110 includes a curved surface 158 that connects the flange surface 148 with the flange surface 154.

As shown in FIG. 4, the arcuate plate 110 includes a pair of inner lobes 160 that are positioned on the inner side 120 opposite the outer lobes 124. In the illustrative embodiment, each inner lobe 160 is configured to be positioned in a channel 92 defined in each bracket 82 of the support housing 34 and engage the bracket 82 to limit axial movement of the retaining clip 50 and limit disengagement of the fasteners 46. Each lobe 160 has a flange 162 that faces either the flange surface 148 or the flange surface 154 and a rounded surface 164 that faces toward the inflection point 134. In other embodiments, an inner lobe may be positioned at the inflection point. In still other embodiments, the arcuate plate 110 may include fewer than two inner lobes or more than two inner lobes. It should also be appreciated that in other embodiments the inner lobes may be omitted.

The arcuate plate 110 also includes a pair of side surfaces 170, 172 that extend between the outer curved surface 122 and the inner curved surface 158. As shown in FIG. 5, a width 174 is defined between the side surfaces 170, 172. The width 174 is also substantially constant between the longitudinal ends 112, 114 of the plate 110. In the illustrative embodiment, the width 174 is equal to about 0.110 inches. The width 174 may be in a range between 0.108 and 0.112 inches. In other embodiments, the width may be between 0.100 inches and 0.200 inches. It should be appreciated that the width may be tailored for an optimum load and/or natural frequency to avoid resonant frequencies in the turbine and to minimize wear.

As shown in FIG. 4, the arcuate plate 110 includes a slot 180 that extends through the side surfaces 170, 172 near the end 112. The slot 180 is a closed slot that is defined by an inner wall 182. The arcuate plate 110 also includes a slot 184 that extends through the side surfaces 170, 172 near the end 114. Like the slot 180, the slot 184 is a closed slot that is defined by an inner wall 186. The slots 180, 184 may be engaged by a tool, such as, for example, a pair of snap ring pliers, which may be used to apply force upon the retaining clip 50 to advance the clip 50 into position relative to the vane assemblies 26 and the support housing 34.

Figure 6:
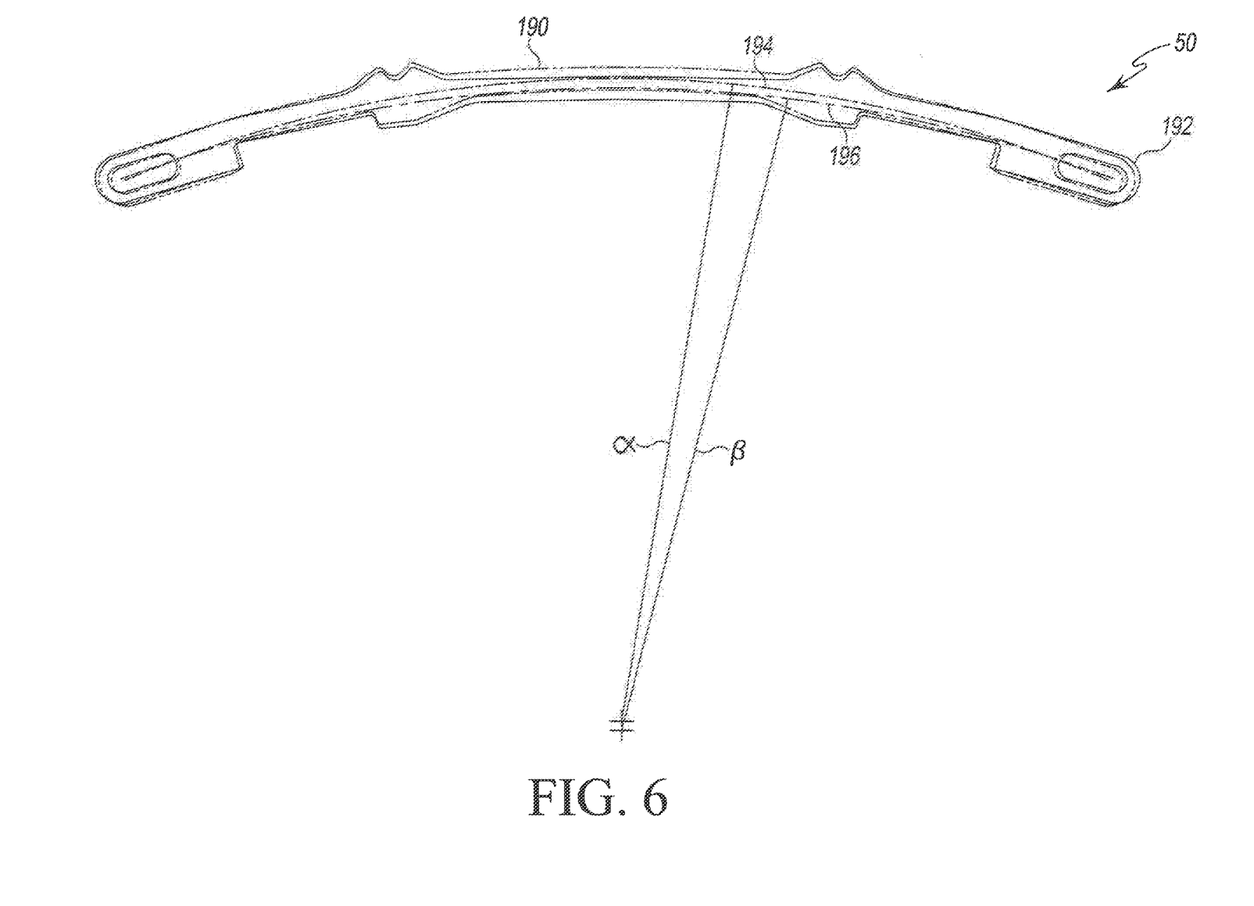
FIG. 6 is an elevation view similar to FIG. 4 showing a loaded curvature and an unloaded curvature of the retaining clip.

Referring now to FIG. 6, the arcuate plate 110 of the retaining clip 50 is configured to elastically deflect between an unloaded curvature (shown in broken line) 190 and a loaded curvature (shown in solid line) 192. When the plate 110 is unloaded, the plate 110 defines an arc 194 having a radius $\alpha$. In the illustrative embodiment, $\alpha$ is equal to about 10.70 inches. When the plate 110 is bent into the loaded curvature, the plate 110 defines an arc 196 having a radius $\beta$. In the illustrative embodiment, the radius $\beta$ is greater than the radius $\alpha$, and the arc 196 is flatter than the arc 194. In other words, the plate 110 bends outward when installed. In the illustrative embodiment, the radius β is equal to about 10.85 inches.

In the illustrative embodiment, the arcuate plate 110 is configured to deflect or bend into the loaded curvature during installation to provide a constant radial inward spring load against the support housing 34 at two locations (i.e., at the tabs 140, 142) and a constant radial outward spring load against one or more fasteners 46 (i.e., at the outer lobes 124), thereby providing a frictional bias resistant to circumferential or axial motion of the retaining clip 50. The radial spring load of the retaining clip 50 is illustratively about 12.5 lbs-force. The arced configuration of the plate 110 creates a "cross-loading" effect along the length 116 of the plate 110. This cross-loading effect applies an inward load at the tab 140, applies an outward load at the outer lobes 124 between the tabs 140, 142, and applies another inward load at the tab 142, thereby assisting in the stabilization of the retaining clip 50 from the vibratory and acoustic effects of the engine.

Figure 7:
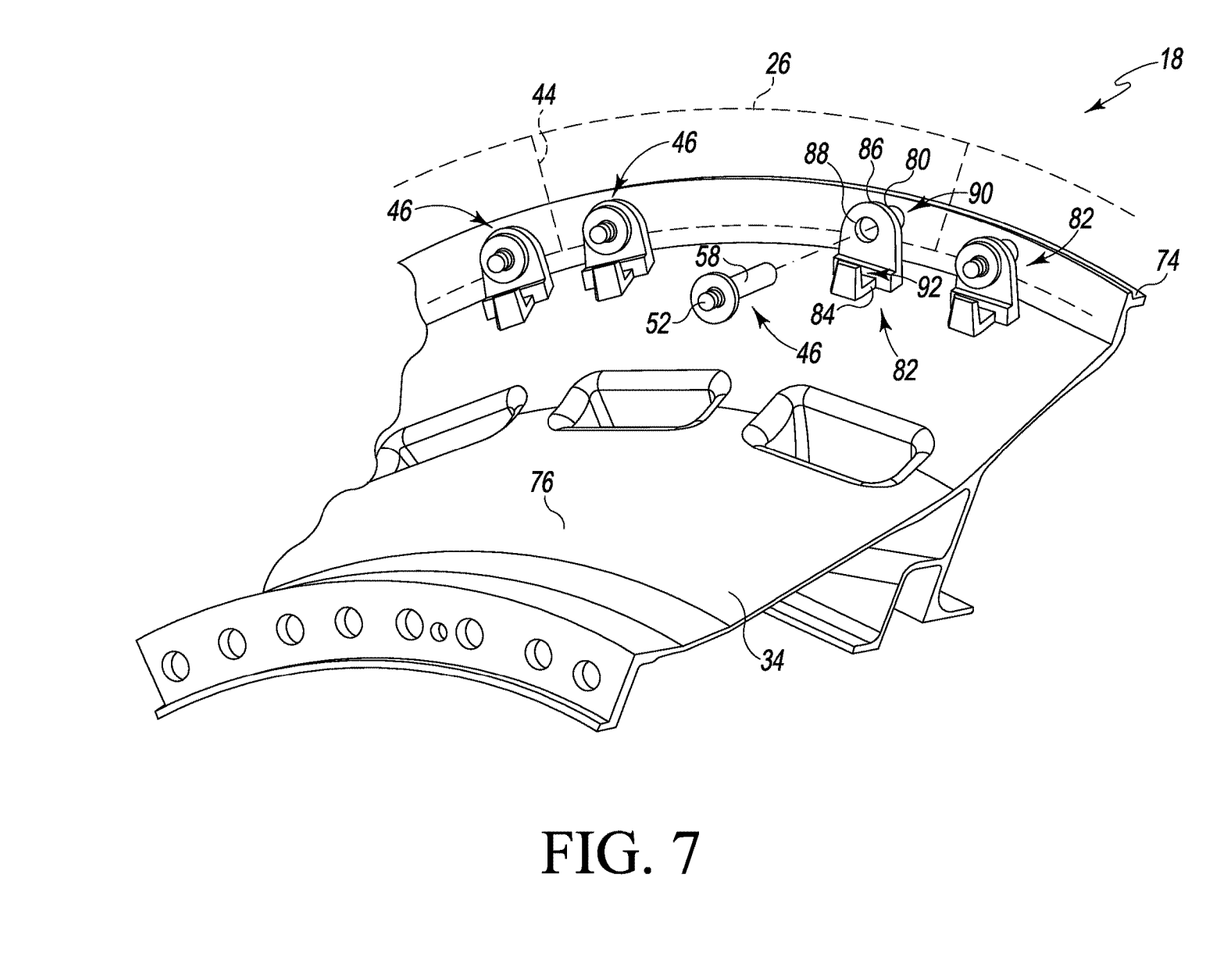
FIGS. 7-9 illustrate steps of a method of securing the vane nozzle segments to the vane support housing.

To secure the rear flange 44 of a vane assembly 26 to the support housing 34, an installer positions the rear flange 44 into the channels 90 defined between a pair of mounting brackets 82 and the annular flange 74 of the support housing 34. The installer may align a pair of holes (not shown) defined in the rear flange 44 with the through-holes 80, 88 defined in the brackets 82 and flange 74. The installer may then advance a bolt 46 into the holes, which define a common bore 48. To do so, an installer may align the body 58 of the bolt 46 with one of the bores 48 and advance the bolt 46 into the bore 48 until its flange 60 engages the rib 86 of the bracket 82. In the illustrative embodiment, two bolts 46 are used to secure the rear flange 44 of each vane assembly 26 to the support housing 34.

After the bolts 46 are positioned in the bores 48, the installer may use the retaining clip 50 to retain the bolts 46 in the bores 48. To install the retaining clip 50, the installer may advance the longitudinal end 112 of the clip 50 into the channel 92 of the first of four mounting brackets 82. The installer may continue to advance the clip 50 along the channel 92 and into another channel 92 of a second mounting bracket 82. When the rounded surface 128 of the lobe 124 is placed in contact with the head 52 of the first bolt 46, the installer may then use a pair of pliers to engage the slot 180 of the retaining clip 50. The installer may pull on the pliers to slide the bolt head 52 along the rounded surface 128 of the lobe 124 and into mounting slot 126 of the retaining clip, as shown in FIG. 8.

Figure 8:
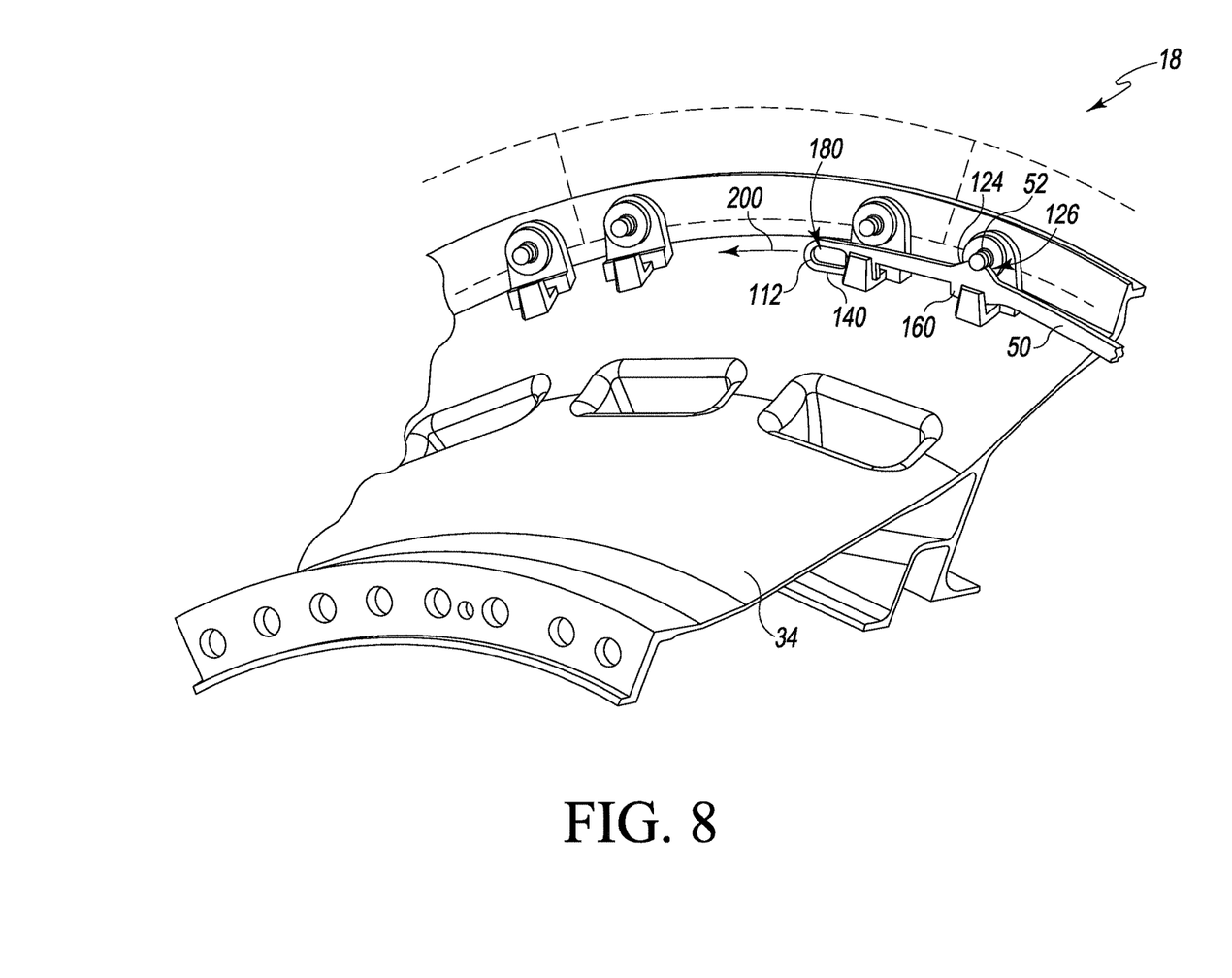
Figure 9:
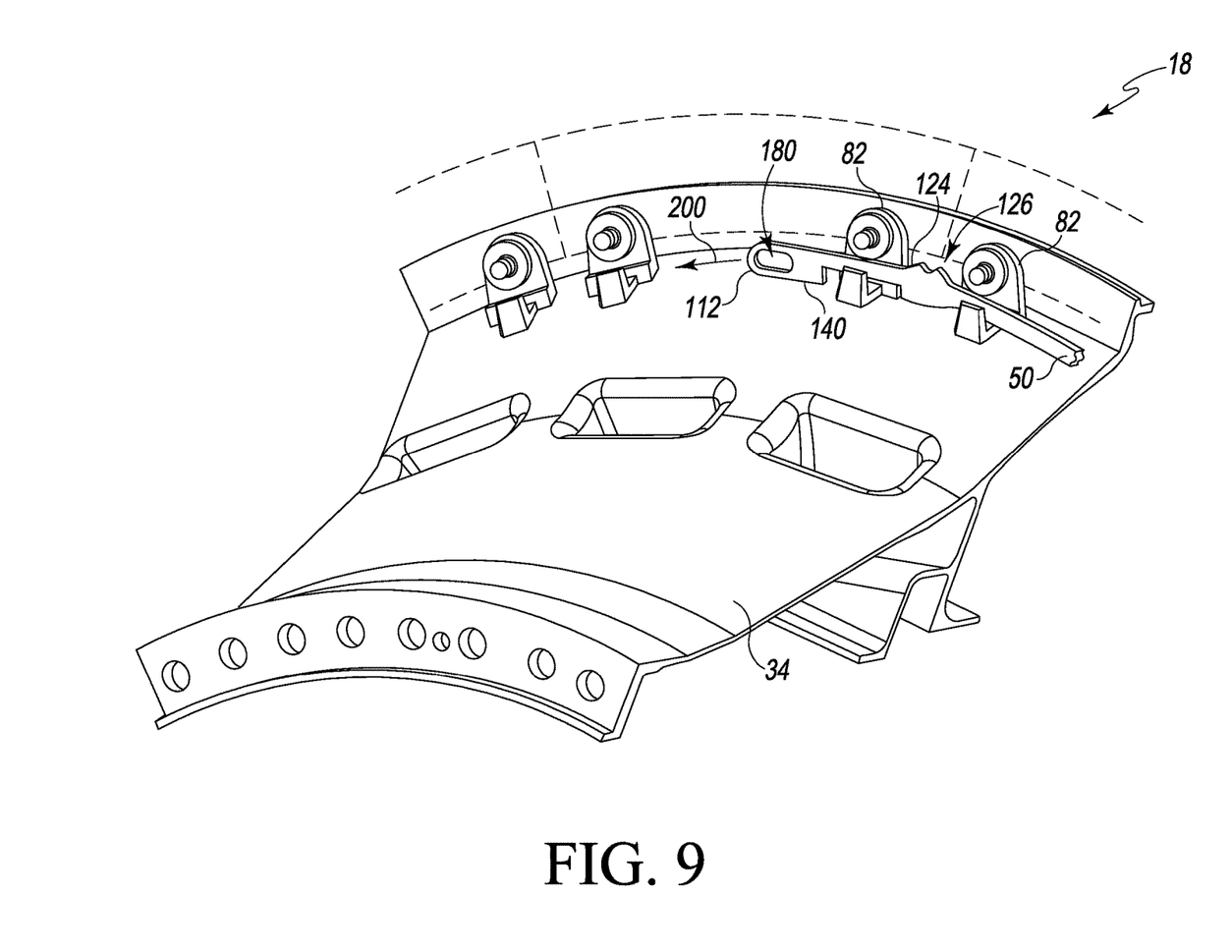

The installer may continue to pull on the pliers in the direction indicated by arrow 200 in FIGS. 8-9 to remove the bolt head 52 from the mounting slot 126. The installer may continue to advance the retaining clip 50 circumferentially along support housing 34 and into the channels 92 of the third and fourth mounting brackets 82. When properly installed, the retaining clip 50 is positioned as shown in FIG. 3, in the loaded curvature. The bolt heads 52 of the middle mounting brackets 82 are positioned in the mounting slots 126 of the retaining clip 50. Each inner lobe 160 of the retaining clip 50 is positioned in a channel 92 defined in the middle mounting brackets 82 and engage the brackets 82 to limit axial movement of the retaining clip 50. The tabs 140, 142 at each end 112, 114 of the retaining clip 50 are engaged with the inner surface 98 of the outer mounting brackets 82, thereby creating the cross-load effect along the length of the retaining clip 50.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A retaining clip for an engine component, comprising:
an arcuate plate extending less than half annularly between a first end and a second end and defining an outer surface that faces radially outward, the arcuate plate including (i) a first mounting tab positioned adjacent to the first end, (ii) a second mounting tab positioned adjacent to the second end, and (iii) at least two lobes extending radially outward from the outer surface, each lobe including a first curved surface and a second curved surface, the first curved surface and the second curved surface of each lobe being connected to and extending radially outwardly from the outer surface and defining therebetween a mounting slot positioned between the first mounting tab and the second mounting tab,
wherein the arcuate plate is configured to deflect elastically between an unloaded curvature in which the arcuate plate defines a first radius and a loaded curvature in which the arcuate plate defines a second radius that is greater than the first radius.

2. The retaining clip of claim 1, wherein the arcuate plate is a metallic plate.

3. The retaining clip of claim 1, wherein:
the arcuate plate further includes an inner surface that faces radially inward,
the first mounting tab includes a first flange extending radially inward from the inner surface, and
the second mounting tab includes a second flange extending radially inward from the inner surface.

4. The retaining clip of claim 3, wherein the mounting slots are positioned along the outer surface.

5. The retaining clip of claim 1, wherein the arcuate plate is biased in the unloaded curvature.

6. The retaining clip of claim 1, wherein the arcuate plate further includes a first slot defined in the first end and a second slot defined in the second end.

7. A turbine, comprising:
a circular housing including a mounting bracket positioned on an outer circumference of the circular housing,
a vane nozzle segment positioned on the outer circumference of the circular housing,
a mounting pin including a head and a body extending from the head, the body extending through a bore defined in the mounting bracket and the vane nozzle segment to secure the vane nozzle segment to the circular housing, and
a retaining clip positioned in a slot defined in the mounting bracket, the retaining clip adapted to exert a radial spring load on the mounting pin relative to the circular housing to retain the mounting pin in the bore defined in the mounting bracket and the vane nozzle segment,
wherein the head of the mounting pin is positioned in a mounting slot defined in the retaining clip, wherein the mounting slot is radially open.

8. The turbine of claim 7, wherein the retaining clip extends from a first end to a second end and defines an arc length between the first end and the second end that is less than the outer circumference of the circular housing.

9. The turbine of claim 7, wherein:
the mounting bracket is a first mounting bracket positioned between a second mounting bracket and a third mounting bracket, and
the retaining clip includes a first tab that is engaged with the second mounting bracket and a second tab that is engaged with the third mounting bracket.

10. The turbine of claim 7, wherein:
the retaining clip includes a radially-outward surface, and
the mounting slot is defined between a first curved surface and a second curved surface, the first curved surface and the second curved surface being connected to, and extending outwardly from, the radially-outward surface.

11. The turbine of claim 7, wherein the retaining clip is a metallic plate.

12. The turbine of claim 7, wherein the body of the mounting pin is unthreaded.

13. A turbine, comprising:
a circular housing including a mounting bracket positioned on an outer circumference of the circular housing,
a vane nozzle segment positioned on the outer circumference of the circular housing,
a mounting pin including a head and a body extending from the head, the body extending through a bore defined in the mounting bracket and the vane nozzle segment to secure the vane nozzle segment to the circular housing, and
a retaining clip positioned in a slot defined in the mounting bracket, the retaining clip exerting a radial spring load on the mounting pin to retain the mounting pin in the bore defined in the mounting bracket and the vane nozzle segment,
wherein the head of the mounting pin is positioned in a mounting slot defined in the retaining clip,
wherein the mounting bracket is a first mounting bracket positioned between a second mounting bracket and a third mounting bracket, and the retaining clip includes a first tab that is engaged with the second mounting bracket and a second tab that is engaged with the third mounting bracket,
wherein:
the retaining clip includes a radially-inward side that faces the circular housing and a radially-outward side positioned opposite the radially-inward side,
the mounting slot is defined in the radially-outward side, and
the first tab and the second tab are positioned on the radially-inward side of the retaining clip.

14. The turbine of claim 13, wherein the retaining clip includes a second mounting slot defined in the radially-outward side.

15. The turbine of claim 14, further comprising:
a fourth mounting bracket positioned on the outer circumference of the circular housing between the first mounting bracket and the second mounting bracket, and
a second mounting pin including a head and a body extending from the head, the body of the second mounting pin extending through a bore defined in the fourth mounting bracket and the vane nozzle segment to secure the vane nozzle segment to the circular housing,
wherein the head of the second mounting pin is positioned in the second mounting slot of the retaining clip.

16. A method of attaching a vane nozzle segment to a turbine housing, the method comprising:
sliding a mounting pin into the vane nozzle segment and the turbine housing, and then
advancing a retaining clip into a slot defined in the turbine housing such that the retaining clip exerts a radial spring load on the mounting pin relative to the turbine housing to retain the mounting pin in the vane nozzle segment and the turbine housing, the retaining clip extending from a first end to a second end and defining an arc length between the first end and the second end that is less than an outer circumference of the turbine housing.

17. The method of claim 16, further comprising:
sliding a second mounting pin into the vane nozzle segment and the turbine housing, and
advancing the retaining clip into a second slot defined in the turbine housing to position a head of the second mounting pin in a mounting slot defined in the retaining clip.

18. The method of claim 17, further comprising engaging a first mounting bracket of the turbine housing with a first tab of the retaining clip and engaging a second mounting bracket of the turbine housing with a second tab of the retaining clip to prevent further circumferential movement of the retaining clip.

* * * * *